United States Patent
Crosland et al.

(10) Patent No.: US 7,263,623 B1
(45) Date of Patent: Aug. 28, 2007

(54) MICROPROCESSOR SYSTEM

(75) Inventors: Andrew Crosland, Hadeddenham (GB); James Tyson, Brunham (GB); Fabio Petrassem de Sousa, High Wycombe (GB); Andrew Draper, Chesham (GB)

(73) Assignee: Altera Corporation, San Jose, CA (US)

( * ) Notice: Subject to any disclaimer, the term of this patent is extended or adjusted under 35 U.S.C. 154(b) by 406 days.

(21) Appl. No.: 10/814,949

(22) Filed: Mar. 30, 2004

(51) Int. Cl.
*G06F 1/00* (2006.01)
*G06F 13/12* (2006.01)

(52) U.S. Cl. ........................... 713/324; 710/72
(58) Field of Classification Search ........ 713/300–340; 710/72–74
See application file for complete search history.

(56) References Cited

U.S. PATENT DOCUMENTS

| | | | | |
|---|---|---|---|---|
| 5,511,013 A | * | 4/1996 | Tokieda et al. | 713/321 |
| 5,933,614 A | * | 8/1999 | Tavallaei et al. | 710/306 |
| 6,817,015 B2 | * | 11/2004 | Takata | 717/168 |
| 6,920,572 B2 | * | 7/2005 | Nguyen et al. | 713/322 |

\* cited by examiner

*Primary Examiner*—Christopher Shin
(74) *Attorney, Agent, or Firm*—Townsend and Townsend and Crew LLP

(57) ABSTRACT

A microprocessor-based system includes multiple peripherals, which can be accessed by the microprocessor over a system bus, with the aid of address decoding logic. Depending on the required functionality of the system at any time, one or more of the peripherals can be disabled. When a peripheral device is disabled, the address decoding logic of the system is modified to ensure that no attempts are made to access that peripheral device.

19 Claims, 1 Drawing Sheet

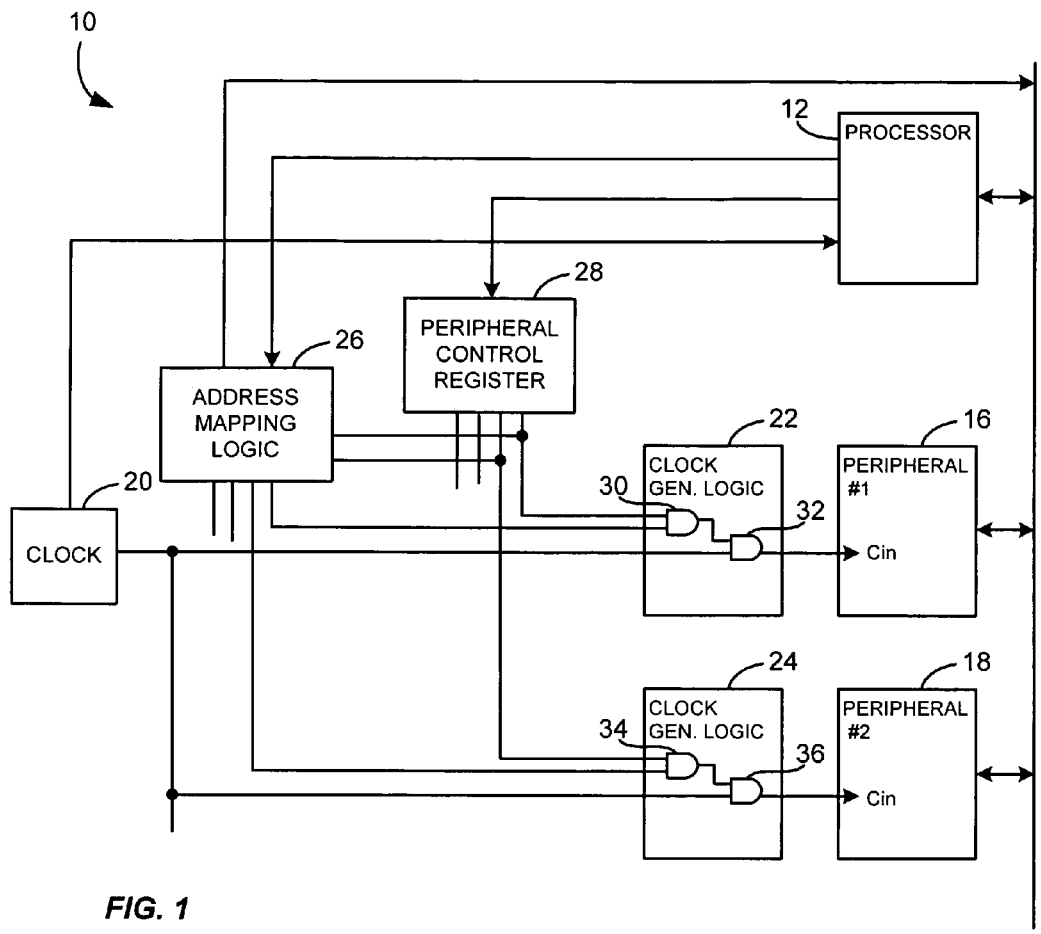
FIG. 1
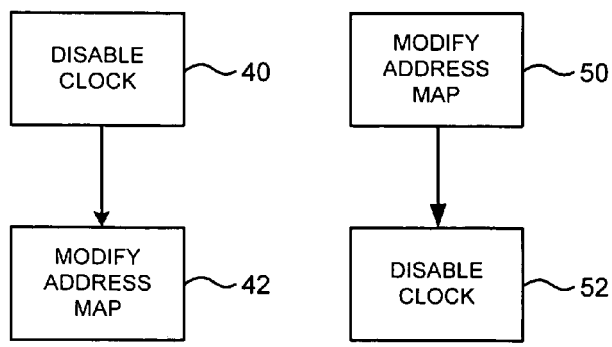
FIG. 2  FIG. 3

MICROPROCESSOR SYSTEM

TECHNICAL FIELD OF THE INVENTION

This invention relates to a microprocessor system, and in particular to a microprocessor system which can be implemented on an integrated circuit, in a way which reduces the power consumption of the device, while ensuring its robust operation.

BACKGROUND OF THE INVENTION

A microprocessor-based system on an integrated circuit includes the processor, but also includes other functional blocks, referred to as peripheral devices, or peripherals. These peripherals are provided for specific purposes, for example to allow the processor to communicate with other devices.

Of course, there is an advantage in providing a relatively large number of such peripherals, in order to increase the available functionality of the device. However, this has the disadvantage that each of the peripherals tends to consume some power, even when the additional functionality, which it provides, is not required.

In order to avoid this disadvantage, it is known to provide a microprocessor-based system of this type, in which peripherals may be disabled and enabled dynamically. That is, at times when the functionality provided by a peripheral device is required, then that peripheral device is allowed to operate in its normal way. However, at other times, when the functionality provided by a peripheral device is not required, the peripheral device is disabled. For example, the system clock may be disconnected from the peripheral device. This means that, at times when the functionality provided by a peripheral device is not required, that peripheral device does not consume any power.

However, in such systems, there remains the disadvantage that, even while a peripheral device is disabled, the software running on the processor may still attempt to access that peripheral device. When this happens, the system will go into an error condition, with results which may not be predictable.

SUMMARY OF THE INVENTION

It is therefore an object of the present invention to provide a system which allows power consumption to be reduced, while also maintaining the robustness of the system, and preventing the occurrence of such errors.

According to a first aspect of the present invention, there is therefore provided a system in which, when a peripheral device is disabled, the address decoding logic of the system is modified so that no attempts are made to access that peripheral device.

According to a second aspect of the invention, there is therefore provided an integrated circuit, comprising a microprocessor and at least one peripheral device having a particular functionality, the microprocessor and the or each peripheral device being connected by a bus, and the integrated circuit further comprising an address map for storing addresses allocated to the or each peripheral device to enable accesses thereto over said bus, wherein the processor is able to disable a peripheral device is disabled when the particular functionality thereof is not required, and wherein, when a peripheral device is disabled, said peripheral device is automatically removed from the address map to prevent further access attempts thereto.

According to a third aspect of the invention, there is provided a method of operation of a microprocessor-based system, comprising at least one peripheral device, and an address map for storing addresses allocated to the or each peripheral device, the method comprising, when the peripheral device is disabled, automatically removing the peripheral device from the address map.

BRIEF DESCRIPTION OF DRAWINGS

FIG. 1 is a block schematic diagram of a microprocessor-based system in accordance with the present invention.

FIG. 2 is a flow chart illustrating a method of operation of the system according to a first embodiment of the invention.

FIG. 3 is a flow chart illustrating a method of operation of the system in accordance with a second embodiment of the present invention.

DETAILED DESCRIPTION OF PREFERRED EMBODIMENTS

FIG. 1 is a block schematic diagram showing a part of a microprocessor-based system, implemented in an integrated circuit. In one preferred embodiment of the present invention, the integrated circuit may take the form of a programmable logic device, for example with an embedded processor, and the various functional blocks described below can be obtained by the appropriate programming of programmable logic elements with the device. However, the system according to the present invention can equally well be implemented in other ways. The general structure, and method of operation, of such devices is well known to the person skilled in the art, and will not be described further, except in so far as this is relevant to an understanding of the present invention.

The system 10 is based around a processor 12, which is connected to a system bus 14.

FIG. 1 shows a system which includes a first peripheral device 16 and a second peripheral device 18. These peripheral devices may, for example, be interfaces to external devices, such as a USB interface, memory controllers, for controlling accesses to external memory devices, DMA (Direct Memory Access) controllers, or bus bridges, for controlling the transfer of data between the bus 14 and another bus within the device. Although only two peripheral devices are shown in FIG. 1, it will be appreciated that the system 10 may include any desired number of such peripheral devices.

In other embodiments of the invention, it may be possible to power down parts of the processor itself, in which case such parts can be regarded as peripheral devices.

The system 10 also includes clock generation circuitry 20, for generating a clock signal at a desired clock rate. The clock signal is supplied to the processor 12, and is also supplied in a controllable way, as will be described later, to the first and second peripheral devices 16, 18.

Associated with the first peripheral device 16, there is a first clock generation logic block 22, while associated with the second peripheral device 18 there is a second clock generation logic block 24. The first and second clock generation logic blocks 22, 24 serve to control the way in which the clock signal is supplied from the clock generator 20 to the first and second peripheral devices 16, 18, respectively.

The system 10 also includes address mapping logic 26, which is connected to the processor 12. When the processor 12 wishes to transfer data on the bus 14, for example to one of the peripheral devices 16, 18, the address mapping logic 26 is used in order to determine the address to which that data must be transmitted.

In accordance with the invention, the address mapping logic 26 also provides an input to each of the clock generation logic blocks 22, 24.

The system 10 also includes a peripheral control register 28, which acts under the control of the processor 12 to provide logic inputs to the first and second clock generation logic blocks 22, 24. As shown in FIG. 1, the logic outputs from the peripheral control register 28 are also connected to the address mapping logic block 26.

Although the peripheral control register 28 is shown in FIG. 1 as a separate functional block, the functionality may be provided within the processor 12, or within each of the peripherals 16, 18, as required. Also, although the peripheral control register 28 is shown here as operating under the control of the processor 12, there are other possibilities. For example, when the system 10 is implemented in the form of a programmable logic device, it may sometimes be implemented in such a way that a peripheral device is never to be used in a particular design. In such a case, the peripheral control register 28 may receive one of the bits of configuration data as an input. In effect, a feature of the design may be to control the peripheral control register 28 to operate in a particular way.

The first clock generation logic block 22 includes a first AND gate 30 and a second AND gate 32. The first AND gate 30 receives logic inputs from the address mapping logic block 26 and the peripheral control register 28. The output from the first AND gate 30 is applied to a first input of the second AND gate 32, and the clock signal from the clock generation circuit 20 is applied to the second input of the second AND gate 32. The output of the second AND gate 32 is applied to a clock input Cin of the first peripheral device 16.

Similarly, the second clock generation logic block 24 includes a third AND gate 34 and a fourth AND gate 36. The third AND gate 34 receives logic inputs from the address mapping logic block 26 and the peripheral control register 28. The output of the third AND gate 34 is applied to a first input of the fourth AND gate 36, and the clock signal from the clock generation circuit 20 is applied to the second input of the fourth AND gate 36. The output of the fourth AND gate 36 is applied to a clock input Cin of the second peripheral device 18.

The operation of the system 10 will now be described with reference to FIG. 2, which is a flow chart illustrating an embodiment of the invention.

In step 40 of the process of FIG. 2, one of the peripheral devices 16, 18 is disabled. For the purposes of this description, it will be assumed that it is the first peripheral device 16 which is disabled, although it will be apparent that the process operates in exactly the same way whichever, and however many, of the peripheral devices is or are disabled. Thus, the processor 12 determines that, at a particular time, the first peripheral device is not to be used. A power saving can therefore be achieved by disabling this peripheral device.

In order to achieve this, a signal is sent to the peripheral control register 28, and the peripheral control register 28 changes its control signal, applied to the first input of the first AND gate 30, from a logical high signal to a logical low signal. With a logical low signal on one input, the output of the first AND gate 30 also becomes a logical low signal and, similarly, with a logical low signal on one of its inputs, the output signal from the second AND gate 32 also becomes a logical low level, irrespective of the signal level on its other input. Therefore, the clock signal from the clock generator 20 is gated off from the clock input Cin of the first peripheral device 16. This peripheral device is therefore disabled.

At the same time, the signal applied from the peripheral control register 28 to the first AND gate 30 is also applied to the address mapping logic block 26. The address mapping logic block 26 acts on this input in such a way as to disable the address space which is allocated to the first peripheral device 16. Thus, in step 42 of the process in FIG. 2, the address map is modified.

This means that the processor 12 is unable to access the first peripheral device 16. If, for example due to a software error, the processor does attempt such an access, then this access is terminated in a predictable way. The effect of this termination is dependent upon the system, but it should not lead to a system crash, and normal operation of the system should continue.

As described so far, the invention is applicable to a device in which the memory map, contained in the address mapping logic block 26, is set up when the device is initially powered up, and remains static during subsequent operation of the device.

However, in this preferred illustrated embodiment of the invention, there is another operating embodiment, as illustrated in FIG. 3, which again is a flow chart illustrating this method. Specifically, as shown in FIG. 1, the address mapping logic 26 is programmable, that is, it operates under the control of the software running on the processor 12. This means that, at any time, the processor 12 can modify the address mapping logic in the address mapping logic block 26, in order to vary the addresses allocated to the various peripheral devices.

In this embodiment of the invention, when the address map is modified in order to remove a peripheral device from the address map, at step 50 in FIG. 3, the address mapping logic 26 provides a logical low output to the corresponding clock generation logic block 22. Again, it will be assumed for the purposes of this further description that it is the first peripheral device 16 which is removed from the address map, although it will be appreciated that, whichever, or however many, of the peripheral devices is or are disabled, the invention will still operate in the same way.

Thus, the address mapping logic block 26 provides a logical low input to the second input of the first AND gate 30, which means that the output of the first AND gate 30 becomes a logical low level, even if its first input is receiving a logical high level signal. The logical low level signal is therefore output from the first AND gate 30 to the second AND gate 32, which means that a low level signal is always applied to the clock input Cin of the first peripheral device 16, and the clock signal from the clock generator 20 is gated off from the first peripheral device 16.

Thus, in step 52 of FIG. 3, the clock signal input is disabled.

Therefore, in this preferred embodiment of the invention, sending a signal to disable the clock signal input to a peripheral device automatically results in a modification of the address map so that accesses to that device are not attempted. At the same time, modifications to the address map, in order to remove a peripheral device from that map, automatically result in the disabling of the clock signal input to that device.

There is therefore provided a system which allows power consumption to be reduced in certain circumstances, while maintaining the robustness of operation of the device.

The invention claimed is:

1. A microprocessor-based system, comprising:
   a microprocessor;
   at least one peripheral device coupled to the microprocessor via a bus;
   an address map coupled to the microprocessor, the address map storing address allocated to the peripheral device to enable accesses thereto over said bus;
   a peripheral control register coupled to receive peripheral control data from the microprocessor;
   peripheral device disable logic coupled between the peripheral control register and to the peripheral device; and
   address mapping logic coupled to the address map to automatically remove an address space allocated to a disabled peripheral device from the address map, whereby an address for the disabled peripheral device is not generated on the bus.

2. The microprocessor-based system as claimed in claim 1, wherein a peripheral device may be disabled by sending a logic signal from the peripheral control register to the peripheral device disable logic associated with said peripheral device.

3. The microprocessor-based system as claimed in claim 2, wherein, when said logic signal is sent from the peripheral control register to the peripheral device disable logic associated with said peripheral device, a corresponding logic signal is also sent to said address mapping logic to remove the address space for said disabled peripheral device from the address map.

4. The microprocessor-based system as claimed in claim 1, having a programmable address map, wherein, when the address space for said disabled peripheral device is removed from the address map, a clock signal is automatically gated off from the peripheral device.

5. The microprocessor-based system as claimed in claim 1, having a programmable address map, wherein, when the address space for said disabled peripheral device is removed from the address map, a logic signal is sent to said peripheral device disable logic to gate off the clock signal from the peripheral device, and thereby disable the peripheral device.

6. The microprocessor-based system as claimed in claim 1, further comprising a clock generator configured to supply a clock signal to each peripheral device, through the associated peripheral device disable logic.

7. The microprocessor-based system as claimed in claim 1, wherein the system is implemented in an integrated circuit, and wherein at least one peripheral device comprises an interface for an external device.

8. A microprocessor-based system as claimed in claim 1, wherein the system is implemented in a programmable logic integrated circuit, and wherein the microprocessor is provided as an embedded circuit, while at least one of the peripheral device is implemented in programmable logic.

9. An integrated circuit, comprising:
   a microprocessor coupled to a peripheral device via a bus;
   address mapping logic coupled to an address map for storing addresses allocated to peripheral device to enable accesses thereto over said bus; and
   a peripheral control register coupled to receive peripheral control data form the microprocessor, and configured to disable a peripheral device, and
   wherein, when a peripheral device is disabled, said address allocated to the disabled peripheral device is automatically removed from the address map to prevent further access attempts thereto.

10. The integrated circuit as claimed in claim 9, wherein said peripheral device comprises an interface to an external device.

11. The integrated circuit as claimed in claim 9, wherein said peripheral device is implemented in programmable logic.

12. The integrated circuit as claimed in claim 9, wherein a peripheral device may be disabled by sending a logic signal from the peripheral control register to the peripheral device disable logic associated with said peripheral device.

13. The integrated circuit as claimed in claim 12, wherein, when said logic signal is sent from the peripheral control register to the peripheral device disable logic associated with said peripheral device, a corresponding logic signal is also sent to address mapping logic to remove the address for said peripheral device from the address map.

14. The integrated circuit as claimed in claim 12, further comprising a clock generator configured to supply a clock signal to the peripheral device, through the associated peripheral device disable logic.

15. The integrated circuit as claimed in claim 9, wherein said address map is programmable, and wherein, when the address for a peripheral device is removed by said microprocessor from the address map, a clock signal is prevented from reaching said peripheral device to disable said peripheral device.

16. In a microprocessor-based system, comprising a microprocessor coupled via a bus to at least one peripheral device, a method of operating the system comprising:
   storing in an address map at least one address corresponding to the at least one peripheral device;
   disabling the at least on peripheral device; and
   automatically removing from the address map an address corresponding to the disabled peripheral device, thereby preventing further access attempts thereto via the bus.

17. The method as claimed in claim 16, wherein disabling the at least one peripheral device comprises supplying a first logic signal from a peripheral control register to a peripheral device disable logic associated with said peripheral device.

18. The method as claimed in claim 16 wherein the disabling step further comprises automatically gating off a clock signal from the peripheral device.

19. The method as claimed in claim 17, wherein the step of automatically removing comprises supplying a second logic signal corresponding to the first logic signal, to said address map to remove the address corresponding to the disabled peripheral device from the address map.

* * * * *